O. P. SMITH.
LURE CONVEYER.
APPLICATION FILED FEB. 26, 1912.

1,038,504.

Patented Sept. 10, 1912.
2 SHEETS—SHEET 1.

WITNESSES:
May Montgomery
E. Fruchbeck

INVENTOR
Owen P. Smith
BY
Hardway Cathey
ATTORNEYS

O. P. SMITH.
LURE CONVEYER.
APPLICATION FILED FEB. 26, 1912.
1,038,504.
Patented Sept. 10, 1912.
2 SHEETS—SHEET 2.
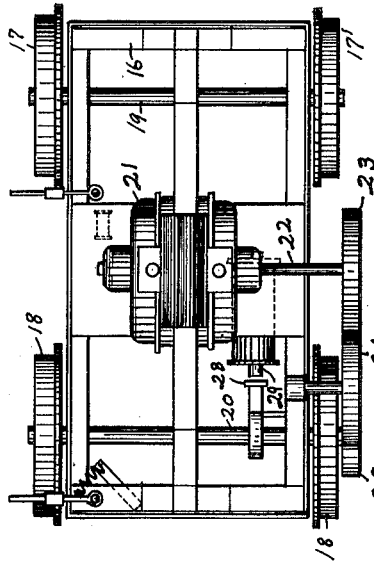
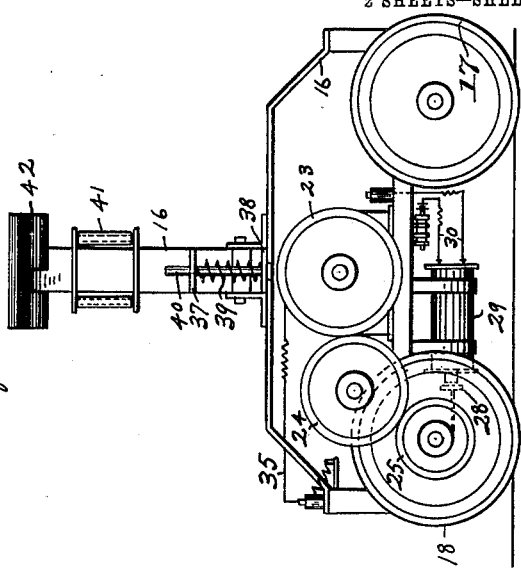
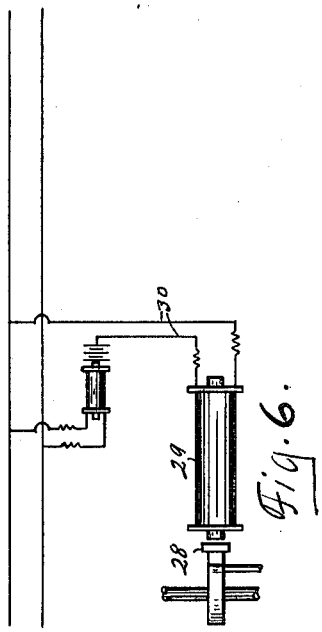
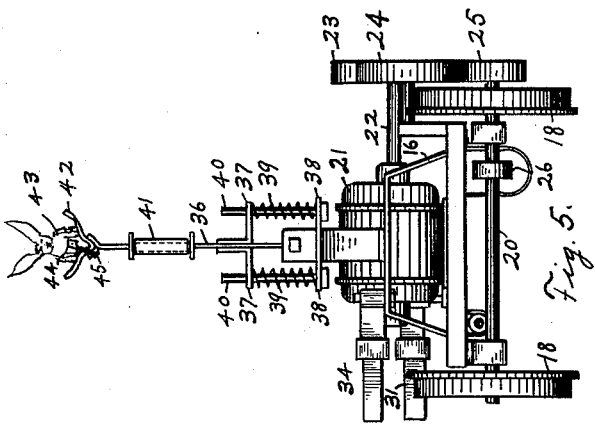
WITNESSES:
May Montgomery
E. Finchback
INVENTOR
Owen P. Smith
BY
Hardway & Cathey
ATTORNEYS

UNITED STATES PATENT OFFICE.

OWEN P. SMITH, OF HOUSTON, TEXAS.

LURE-CONVEYER.

1,038,504.     Specification of Letters Patent.     Patented Sept. 10, 1912.

Application filed February 26, 1912. Serial No. 680,057.

*To all whom it may concern:*

Be it known that I, OWEN P. SMITH, a citizen of the United States, residing at Houston, in the county of Harris and State of Texas, have invented certain new and useful Improvements in Lure-Conveyers, of which the following is a specification.

My invention relates to new and useful improvements in lure conveyers and has more particular relation to such devices as are intended to be used for conveying the lure used in dog races.

The object of the invention is to provide an underground track and a conveying mechanism thereon which are entirely hidden from view and which carry the lure which is visible above the surface of the ground.

Another object of the invention resides in the provision of a controlling mechanism for the lure conveyer whereby the operation of the same will be under the immediate control of the operator.

With the above and other objects in view, the invention has particular relation to certain novel features of construction operation and arrangement of parts, an example of which is given in this specification and illustrated in the accompanying drawings, wherein—

Figure 1:
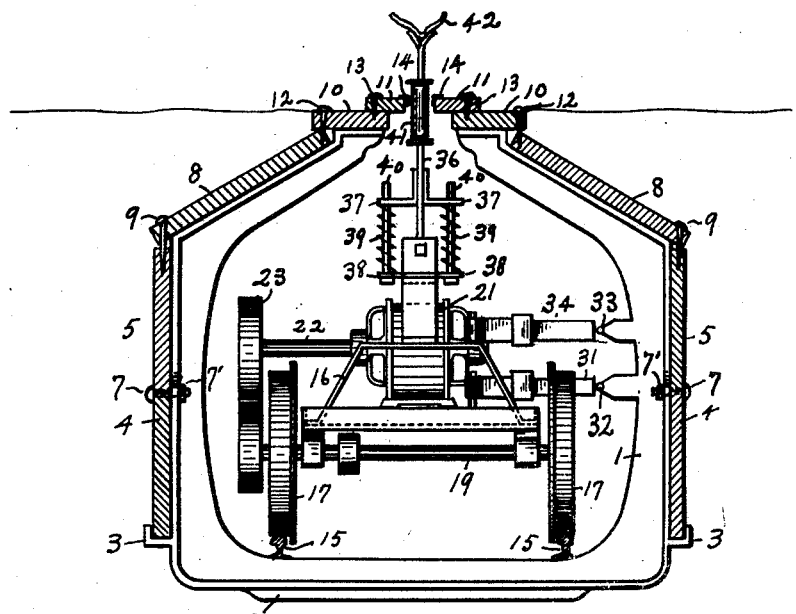
Figure 2:
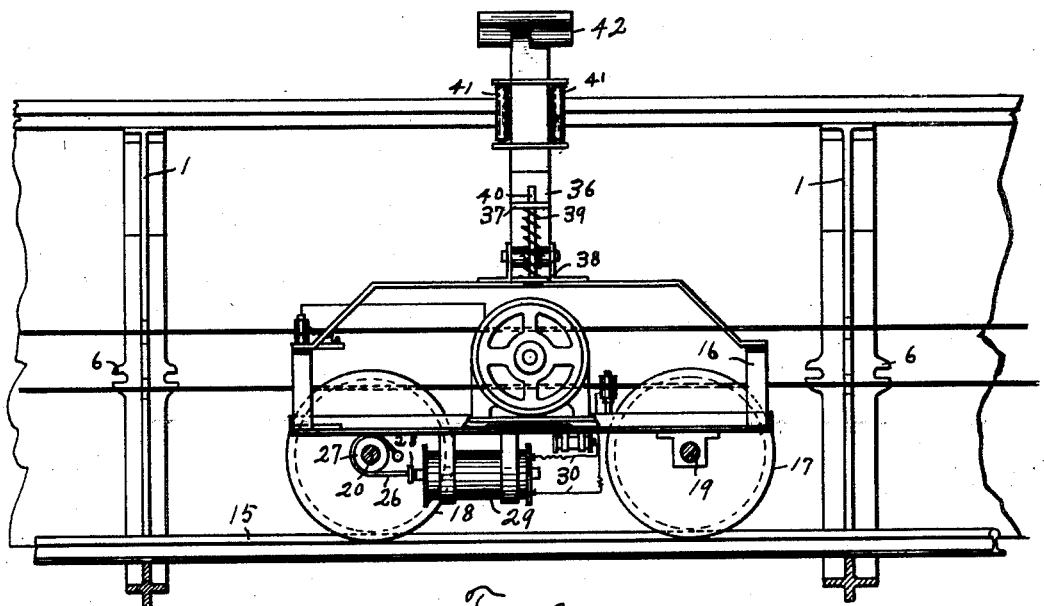

Figure 1 is a front elevation of the conveyer located on the track and in the underground tunnel through which it moves. Fig. 2 is a sectional side elevation thereof with the rear wall of the tunnel removed. Fig. 3 is a plan view of the conveyer. Fig. 4 is a side elevation thereof showing the propelling mechanism. Fig. 5 is a rear view of the conveyer. Fig. 6 is a detail of the brake mechanism.

Referring now more particularly to the drawings wherein like numerals of reference designate similar parts in each of the figures, the numeral 1 refers to a girder of cast metal or some similar durable material which in plan presents the contour of a cross section of the tunnel of which it forms a part. These girders are placed a uniform distance apart along the tunnel and rest on ties 2 and form the frame work of the tunnel structure. Extending laterally from each side of the girder are the supporting hooks 3 which are designed to receive the lower edge of the side boards 4 whose upper edges support similar side boards 5, said boards 4 and 5 extending lengthwise of the tunnel and forming the sides thereof. Alined with the joint between the boards 4 and 5 on each side of the girders are laterally projecting fingers 6, and a suitable bolt 7 passes through the joint and its head engages against the adjacent edges of the boards 4 and 5; said bolt extending through between the fingers 6 and being secured in place by means of the nut 7'. The sides of the girder stand at rightangles to the bottom thereof up to near the surface of the ground and then converge inwardly toward each other but the free ends do not quite meet, thus forming a top which slopes downwardly in opposite directions and on each side of the tunnel and resting upon the sloping top portion of the girders are the lengthwise extending boards 8, whose lower edges are secured to the boards 5 by means of the spikes 9, thus forming a roof-like covering for the tunnel, the comb of which is completed by means of the boards 10 and 11, the former of which are spiked to the boards 8 by means of spikes 12 and the latter of which are adjustably secured to the former by means of set-screws 13.

It will be observed that the sides and top of the tunnel are thus formed of longitudinally extending timbers forming a tunnel with a sloping roof and having the roof members arranged in pairs on each side but the extreme top members 11 do not quite meet, thus forming a longitudinal passageway along the top of the tunnel for a purpose to be hereinafter set forth. The top members 11 are flush with the surface of the ground and their inner edges are lined with plates 14 to protect the same against wear. Within the tunnel is the conveyer proper which runs upon the rails 15 forming the track. The conveyer consist of frame work 16 mounted upon front and rear carrier wheels 17 and 18 rigidly mounted upon their respective axles 19 and 20. This conveyer carries the motor 21 whose drive shaft 22 carries a rigidly mounted gear wheel 23 which meshes with the gear wheel 24 which in turn meshes with a gear wheel 25 rigidly mounted upon axle 20 and through this gear mechanism motion may be imparted from the motor to the carrier wheels of the conveyer.

The numeral 26 refers to a band brake, one end of which is secured to the frame work of the conveyer. This brake surrounds a disk 27 rigidly mounted upon the shaft 20 and its free end has a magnet 28 alined with a magnet 29 suspended from the conveyer frame and charged through wires 30. When the magnet 29 is charged it operates through its attraction for the magnet 28 to set the brake on the disk 27 and when the electricity is cut off from the wires 30 the brake 26 is released. The wires 30 communicate with a brush 31 which in turn contacts with a feed wire 32 which extends entirely along the wall of the tunnel. A similar feed wire 33 extends along the wall of the tunnel and is arranged to contact with a brush 34 which in turn conducts electricity to the motor through the wires 35.

The wires 32 and 33 are connected to a main feed wire (not shown) by switch mechanism such that when the current is connected with one wire it will be disconnected from the other with the end in view that when the motor is started the brake will be released and vice versa.

Extending upwardly from the central portion of the frame 16 is a support 36 which has a hinge near the bottom thereof so as to permit the top of the support to move laterally in each direction and secured to the movable and stationary parts of this support above and below the hinge and extending laterally therefrom are the respective arms 37 and 38, interposed between the free ends of which are strong coil springs 39 surrounding the stays 40 which are secured to the arms 37 and have a slidable engagement with the arms 38. This construction operates to normally hold the support 36 in vertical position but at the same time permits the lateral movement thereof. This support extends up through the passageway along the top of the tunnel and moves along as the conveyer moves and is provided with the roller bearings 41 in the front and rear thereof which minimize the friction against the plates 14. The top of the support 36 is divided forming a Y in which an oblong platform 42 rests. This platform is provided to receive an artificial animal 43 which has a metallic plate 44 secured to its body and a set screw 45 passes through one arm of the Y carried by the top of the support 36 and also the platform 42 and is tapped into the plate 44 and secures the platform and lure in place.

The tunnel is usually constructed in the shape of a circle or ellipse so as to obviate any short angles or turns and thus minimize the friction of the support 36 against the sides of the passageway through which it extends.

This device is intended to be used for races and is provided for the purpose of substituting an inanimate lure for a live animal, thus retaining all of the exciting and advantageous features of the sport but eliminating the inhuman features connected with the use of a live animal for the race.

What I claim is:—

1. A device of the character described composed of a track and a tunnel inclosing the same, a conveyer arranged to move on said track, a motive mechanism for said conveyer, a flexible support carried by the conveyer and projecting through a lengthwise passageway along the upper side of the tunnel, rotatable bearings carried by the support and operating against the sides of said passageway and a lure mounted upon the upper end of said support and moving lengthwise of the tunnel and above the same.

2. A device of the character described composed of a tunnel and a track in the bottom thereof, a conveyer arranged to move on said track, a motive mechanism for said conveyer, a suitable brake mechanism provided therefor for the purpose of regulating the movement thereof, a support yieldably secured to the conveyer and having lateral movement relative thereto and projecting through a lengthwise passageway along the upper side of the tunnel antifriction members carried by the support and operating against the sides of the passageway and a lure mounted upon the upper end of said support.

3. A device of the character described, composed of a tunnel having a lengthwise passageway along the upper side thereof, a track in the bottom of said tunnel, a conveyer arranged to move on said track, a motive mechanism for said conveyer, a suitable brake mechanism provided for the purpose of regulating the movement thereof, a support yieldably secured to the conveyer and having lateral movement relative thereto and projecting through the lengthwise pasageway of the tunnel, suitable bearing members carried by said support and operating against the sides of the passageway, a platform carried by the upper end of said support and a lure secured to said platform.

4. In a device of the character described, a conveyer comprising a frame work and carrier wheels, upon which the frame work is mounted, a motive mechanism operatively connected with the carrier wheels, a yieldable support upstanding from the frame work, laterally extending arms on each side of said support and resilient members interposed between the free ends of said arms, a platform carried by the upper ends of said support and a lure secured on said platform.

5. A device of the character described, including a tunnel and a track located therein, a conveyer arranged to move on said track, a motive mechanism for said conveyer, a support hinged to the conveyer and laterally movable relative thereto and projecting through a lengthwise passageway along the upper side of the tunnel and a lure mounted upon said support.

In testimony whereof I have signed my name to this specification in the presence of two subscribing witnesses.

OWEN P. SMITH.

Witnesses:
 A. C. GREEN,
 MAY MONTGOMERY.